(12) United States Patent
Baughman

(10) Patent No.: US 8,345,932 B2
(45) Date of Patent: Jan. 1, 2013

(54) SUPPORT VECTOR MACHINE FOR BIOMETRIC DATA PROCESSING

(75) Inventor: Aaron K. Baughman, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 1073 days.

(21) Appl. No.: 12/276,675

(22) Filed: Nov. 24, 2008

(65) Prior Publication Data

US 2010/0128936 A1 May 27, 2010

(51) Int. Cl.
*G06K 9/00* (2006.01)
(52) U.S. Cl. .......................................... 382/115; 902/3
(58) Field of Classification Search .................. 382/100, 382/115, 116, 117, 118, 119, 124, 125, 126, 382/127; 235/380–382.5; 340/5.1–5.92; 704/246, 247; 902/3; 351/200, 205, 206
See application file for complete search history.

(56) References Cited

U.S. PATENT DOCUMENTS

| | | | | |
|---|---|---|---|---|
| 6,128,608 | A * | 10/2000 | Barnhill | ........................ 706/16 |
| 6,327,581 | B1 | 12/2001 | Platt | |
| 6,920,231 | B1 | 7/2005 | Griffin | |
| 7,054,468 | B2 * | 5/2006 | Yang | ............................ 382/118 |
| 7,092,555 | B2 * | 8/2006 | Lee et al. | ....................... 382/118 |
| 7,242,810 | B2 * | 7/2007 | Chang | ............................ 382/227 |
| 7,245,767 | B2 | 7/2007 | Moreno et al. | |
| 7,447,338 | B2 * | 11/2008 | Kim | ............................... 382/118 |
| 7,505,621 | B1 * | 3/2009 | Agrawal et al. | ............... 382/159 |

FOREIGN PATENT DOCUMENTS

CN 1372222 10/2002

OTHER PUBLICATIONS

Bicego et al., Face Recognition with Multilevel B-Splines and Support Vector Machines, WBMA '03, Nov. 8, 2003, Berkeley, California, USA.
Schulman et al., The Identification of Users by Relational Agents, Proc. of 7th Int. Conf. on Autonomous Agents and Multiagent Systems (AAMAS 2008), Padgham, Parkes, Muller and Parsons (eds.), May 12-16, 2008, Estoril, Portugal, pp. 105-111.
Andrew et al., Integrated Wavelet and Fourier-Mellin Invariant Feature in Fingerprint Verification System, WBMA'03, Nov. 8, 2003, Berkeley, California, USA.

* cited by examiner

*Primary Examiner* — Anand Bhatnagar
(74) *Attorney, Agent, or Firm* — Douglas A. Lashmit; Hoffman Warnick LLC

(57) ABSTRACT

A system, method and program product for processing biometric data. A biometric data processing system is disclosed that includes: at least one signal acquisition system for collecting biometric input; a feature extraction system for extracting feature vectors from the biometric input; and a support vector machine (SVM) having a plurality of kernel functions, wherein each kernel function is configured for mapping a feature vector to a high dimensional hyperspace structure.

20 Claims, 2 Drawing Sheets

SUPPORT VECTOR MACHINE FOR BIOMETRIC DATA PROCESSING

FIELD OF THE INVENTION

This disclosure relates to processing biometric data, and more particularly to a system and method of utilizing a support vector machine for biometric data processing and identification.

BACKGROUND OF THE INVENTION

The ability to utilize biometric data (e.g., fingerprints, facial features, iris, etc.) for identification purposes is an important task in many fields. Because of the numerous applications, technologies, and biometric data types that are utilized, the quantity and magnitude of biometric databases continue to increase in size and scope.

Unfortunately, larger database sizes typically translate into slower searching speeds and higher error rates when trying to identify a match for an inputted sample. For instance, if every United States citizen enrolled all 10 fingerprints, the national database would exceed 3 billion samples.

Technological advances have increased at least some processing within the biometric identification problem. For example, automated fingerprint systems are generally decomposed into fingerprint capture, feature extraction, file partitioning or binning, a prescreen matcher, a secondary matcher and decision logic. Fingerprint identification is a highly separated process such that a matcher and a templatizer algorithm can be placed on separate computing nodes. The massive parallelization enables a high matching and templitizing velocity. Numerous feature extraction, pattern recognition and template matching algorithms have been developed and analyzed with respect to speed and a receive operator curve. Techniques such as file partitioning, indexing or binning algorithms reduce the search space of a biometric database.

The problems associated with biometric data processing however become even more acute when multiple biometrics (e.g., fingerprints, iris, handwriting, etc.) are utilized as part of an identification process. In particular, larger databases, different types of data structures, different processes, etc., must be accommodated within a single system. Currently, there are limited solutions for providing such an infrastructure. Accordingly, a need exists for a biometric infrastructure that can effectively process different biometric features in a comprehensive manner.

SUMMARY OF THE INVENTION

The present invention relates to a system, method and program product for processing pattern data using a support vector machine that projects feature vectors to a high dimensional hyperspace structure. In one embodiment, there is a biometric data processing system, comprising: at least one signal acquisition system for collecting biometric input; a feature extraction system for extracting feature vectors from the biometric input; and a support vector machine (SVM) having a plurality of kernel functions, wherein each kernel function is configured for mapping a feature vector to a high dimensional hyperspace structure.

In a second embodiment, there is a computer readable medium having a computer program product stored thereon for processing biometric data, comprising: program code for extracting feature vectors from a biometric input; and program code for implementing a support vector machine (SVM) having a plurality of kernel functions, wherein each kernel function is configured for mapping a feature vector to a high dimensional hyperspace structure.

In a third embodiment, there is a method for processing biometric data, comprising: extracting a set of feature vectors from a biometric input; providing a support vector machine (SVM) having a plurality of kernel functions, wherein each kernel function is configured for mapping a feature vector to a high dimensional hyperspace structure; and mapping each extracted feature vector into the high dimensional hyperspace structure.

In a fourth embodiment, there is a method for deploying a system for processing biometric data, comprising: providing a computer infrastructure being operable to: extract a set of feature vectors from a biometric input; provide a support vector machine (SVM) having a plurality of kernel functions, wherein each kernel function is configured for mapping a feature vector to a high dimensional hyperspace structure; and map each extracted feature vector into the high dimensional hyperspace structure.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
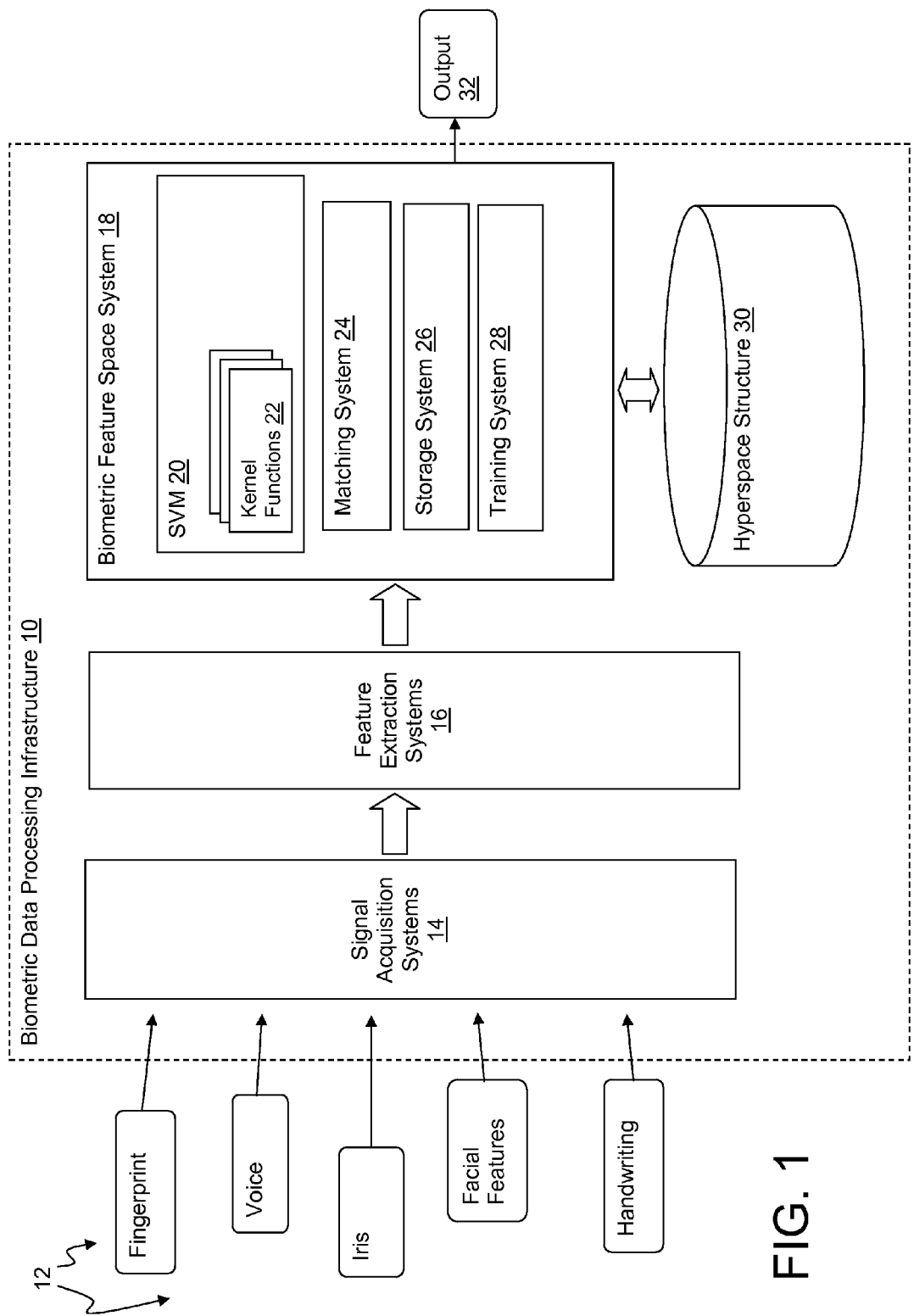
FIG. 1 depicts a biometric Data Processing Infrastructure in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring to FIG. 1, a biometric data processing infrastructure 10 is shown that takes as input one or more different types of biometric input 12 via signal acquisition systems 14. Illustrative types of biometric input 12 include, but are not limited to, fingerprint, voice, Iris, retina, facial features, handwriting, etc. Once acquired, feature extraction systems 16 extract feature data (i.e., feature vectors) from the biometric input 12. Signal acquisition systems 14 and feature extraction systems 16 may comprise any now known or later developed technologies.

For instance, an illustrative signal acquisition system 14 may comprise a fingerprint reader that scans fingerprint features. An illustrative feature extraction system 16 may create a first feature vector that indicates a digit (i.e., finger 1-10) and a second feature vector that captures a ridge flow pattern classification of the fingerprint. It is understood that the number and type of feature vectors captured from each type of biometric input 12 can vary, and any descriptions provided herein are for illustrative purposes only. Furthermore, while the illustrative embodiments provided herein are described with reference to processing biometric data, it is understood that the invention could be used to process any type of pattern or analytical data.

Also included in the biometric data processing infrastructure 10 is a biometric feature space system 18 that includes a support vector machine (SVM) 20 that maps feature vectors to a high dimensional hyperspace structure 30. As described herein, hyperspace structure 30 is thus configured to store and retrieve data for a variety of biometric data types in an efficient manner. In addition to SVM 20, biometric feature space system 18 may include various applications, such as a matching system 18 for matching biometric inputs 12 to data stored in the hyperspace structure 30, e.g., for identification purposes; a storage system 26 for storing biometric inputs 12 into the hyperspace structure 30; and a training system 28 for training the SVM 20. Output 32 may for instance comprise an identification of an individual based on biometric input 12.

Support vector machine 20 is a known technology in the pattern recognition field that projects feature vectors into a linear or non-linear state space with a kernel function 22. The illustrative embodiment includes a plurality of kernel functions 22, each capable of mapping a predetermined type of biometric feature vector to the hyperspace structure 30. In general, each kernel function 22 projects a feature vector into a high dimensional hyperspace structure 30 that provides sparse separable clusters or classifications of data.

Accordingly, hyperspace structure 30 defines a universe, and a subset of fingerprint, voice, iris, etc., dimensions define sub-universes. Hyperspace structure 30 may thus be defined as follows:

H=Hyperspace
$\Lambda_i$=Sub-Universe
$\Omega_w$=World
$\phi_{i,j}$=Dimension
$\rho_{i,j}$=Policy
$\delta_{i,j,k}$=Operator
$A_l$=Cluster
$\alpha_{l,i,j}$=Bin Member where i=sub-universe number, j=dimension number, k=operator number, l=cluster number, m=world number.

$$A_l = \{\forall_{l,i,j}\}$$

A cluster is defined as the set of all cluster members. Each cluster member is vectored into a high dimensional space. In the case of fingerprint processing, the stochastic classification of cluster member ridge flow requires overlapping sample vectoring. For example, if finger position 5 is classified as an arch with a probability of 10%, FBI statistics show that 83% of digits on position 5 are right loops. As such, the data element will be replicated into two samples with a classification value of arch and right loop.

$$\Lambda_i = \{\forall_{i,j}\}$$

A sub-universe is defined as a set of dimensions. Independent types of data samples such as fingerprint, iris, facial, etc., is vectored into sparse n-dimensional spaces.

$$\phi_{i,j} = \exists_{i,j} U\{\forall_{i,j,k}\}$$

For each dimension there exists an associated policy and a set of operators. The policy provides an association between operators or heuristics and a dimension.

$$\Omega_w = \{\{\{\forall_{l,i,j}\} \epsilon \{\Lambda_i\}\} U \{\Lambda_i\}\}$$

The world automaton specifies the set of all data elements which belong to all clusters within a sub-universe and the universe.

$$H = \{\forall \Omega_w\}$$

Finally, the hyperspace automaton defines the universe of a problem domain.

As noted, a kernel is a parametric function capable of projecting dimensional data onto high dimensional spaces. A function, f(x,w), creates a mapping of input x to output y with w weights. A training phase selects w that minimizes real classification error E.

$$E(f(x, w)) = \sum_{t=1}^{m} l(f(x_t, w), y_t).$$

The kernel function selected and trained includes multiple independent kernels $k_1$, $k_2$, $k_3$, etc.

$$k(x,x') = k_1(x,x') + k_2(x,x') \ldots$$

defines a kernel from the summation of a plurality of separate kernels. In one illustrative example, the first kernel may map fingerprints into finger digit positions. The right thumb is position one while the left thumb is position six as in the equation:

$$k_1(x,x') = p(x_i) = r, r \epsilon [1\text{-}10].$$

A second kernel, $k_2$, may be used to define a c-means clustering bootstrapped from the x' weights. The cluster membership is selected from:

$$k_2(x, x') = c(x_j, x') = \min \left\| \sum_{k=0}^{N} (q(x)_j - x'_k)^2 \right\|.$$

The feature vector of the member is transformed into a normalized value from:

$q(x) = sx_k, s \epsilon \Re..$

The function $\bar{x}$ defines the higher dimensional mapping $$k(x, x') = \bar{x}\left(r + \min \left\| \sum_{k=0}^{N} ((sx_k)_j - x'_k)^2 \right\| \right).$$

Working towards a linear dual representation, $$k(x,x') = \Phi(x)^T \Phi(x') = (x_i, x_j),$$

results in a two dimensional mapping. Additional kernels could likewise be implemented to add additional dimensions, e.g., for other fingerprint feature vectors, or other feature vectors from other biometric inputs.

In one illustrative example, kernel function 22 may comprise a bootstrapped C-means clustering algorithm for mapping data values into clusters. Initially, each data element itself is a cluster. Sequentially, the data elements are evaluated for cluster membership by the Euclidean distance between its feature vector, a single classification point, and each cluster's epicenter. If the sample's smallest distance from a cluster is less than an empirically determined threshold, 1 metric unit, the data sample is placed into the cluster. Otherwise, a new cluster is formed. When the probability is lower than a selected threshold, i.e. 50%, a second most likelihood classification is chosen from the NIST data model. Both the hypothesized class and the most likelihood class are clustered. The clustering algorithm continues until none of the epicenters moved within the cluster space.

Bootstrapped C-Means Clustering Pseudo Code
Step 1: Through supervised learning, determine a threshold value
  Step 2: Assign each member to a cluster
    a) For each member:
      i) Determine the minimum Euclidean distance to a cluster's single dimensional centroid
      i.a. If the classification is below a selected confidence level, create a secondary classification member and goto step a.
      ii) If the distance is greater than the threshold,
      ii.a. Create a new cluster
      ii.b. Initialize the cluster's epicenter to the new feature vector
      iii) Otherwise, add the member to the closest cluster
      iii.a. Recalculate the cluster single dimensional centroid
    b) Determine if the cluster epicenters have changed
      i) If true, goto step a.
      ii) If false, goto step 3.
  Step 3: Return the cluster space The clustering threshold is calculated as the unit value 1. The mapping of a fingerprint classification can be mapped with the equation:

$$y(\text{digit}) = f\left( \begin{array}{c} [r1, r2, r3, r4, r5, l1, l2, l3, l4, l5] = \\ [1, 2, 3, 4, 5, 6, 7, 8, 9, 10] \end{array} \right)$$

Figure 2:
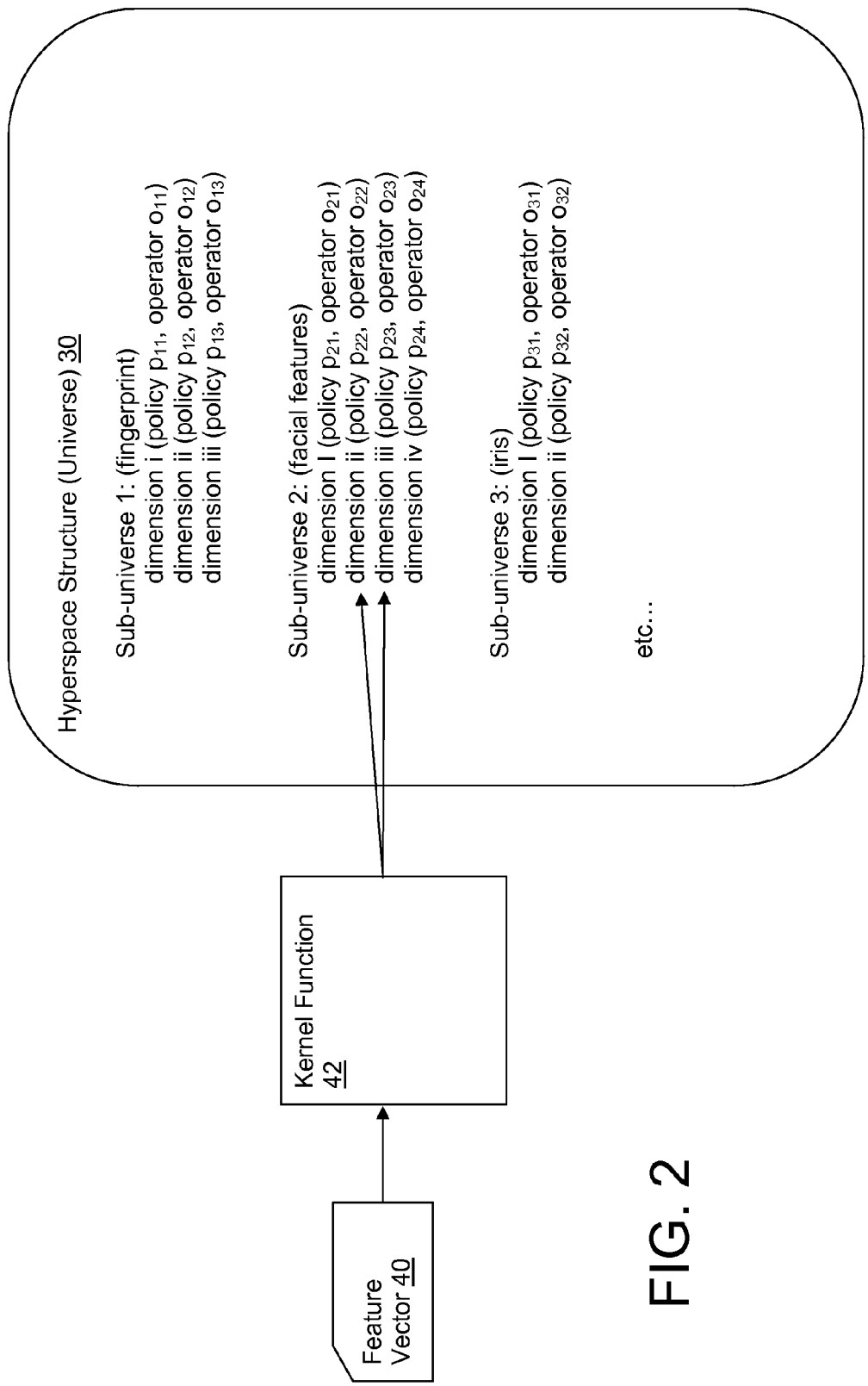
FIG. 2 depicts an overview of a hyperspace structure in accordance with the embodiment of the invention.

FIG. 2 depicts an overview of a hyperspace structure (i.e., universe) 30. As can be seen, hyperspace structure 30 includes a plurality of sub-universes, each representing a different type of biometric data (e.g., fingerprint, facial features, iris, etc.). Each sub-universe includes a set of dimensions, and each dimension corresponds with a particular feature vector. In this example, kernel function 42 has mapped feature vector 40 into dimension ii of sub-universe 2. Each dimension also includes a policy and an operator.

Referring again to FIG. 1, it is understood that biometric data processing infrastructure 10 may be implemented as any type of computing system or device. Such a computing system generally includes a processor, input/output (I/O), memory, and a bus. The processor may comprise a single processing unit, or be distributed across one or more processing units in one or more locations, e.g., on a client and server. Memory may comprise any known type of data storage, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms. A data warehouse for holding data associated with hyperspace structure 30 may likewise reside at a single physical location, comprising one or more types of data storage, or be distributed across a plurality of physical systems in various forms.

I/O may comprise any system for exchanging information to/from an external resource, such as a signal acquisition system 14. External devices/resources may comprise any known type of external device, including a monitor/display, speakers, storage, another computer system, a hand-held device, keyboard, mouse, voice recognition system, speech output system, printer, facsimile, pager, etc. A bus provides a communication link between each of the components in the computer system and likewise may comprise any known type of transmission link, including electrical, optical, wireless, etc. Although not shown, additional components, such as cache memory, communication systems, system software, etc., may be incorporated into computer system.

Access to the computer system may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a biometric feature space system 18 could be created, maintained and/or deployed by a service provider that offers the functions described herein for customers. That is, a service provider could offer to deploy or provide the ability to map feature vectors as described above.

It is understood that in addition to being implemented as a system and method, the features may be provided as a program product stored on a computer-readable medium, which when executed, enables a computer system to provide a biometric data processing infrastructure 10. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A biometric data processing system, comprising:
    at least one signal acquisition system for collecting biometric input;
    a feature extraction system for extracting feature vectors from the biometric input; and
    a support vector machine (SVM) having a plurality of kernel functions,
    wherein each kernel function is configured for mapping a feature vector to a high dimensional hyperspace structure,
    wherein the high dimensional hyperspace structure is defined as follows:
    H=Hyperspace
    $\Lambda_i$=Sub-Universe
    $\Omega_w$=World
    $\phi_{i,j}$=Dimension
    $\rho_{i,j}$=Policy
    $\delta_{i,j,k}$=Operator
    $A_l$=Cluster
    $\alpha_{l,i,j}$=Bin Member
    where i=sub-universe number, j=dimension number, k=operator number, l=cluster number, m=world number, $A_l = \{\forall_{l,i,j}\}$ where a cluster is defined as a set of all cluster members, each cluster member being vectored into a high dimensional space, $\Lambda_i = \{\forall_{i,j}\}$ where a sub-universe is defined as a set of dimensions, $\phi_{i,j} = \exists_{i,j} \cup \{\forall_{i,j,k}\}$ where for each dimension there exists an associated policy and a set of operators, the policy providing an association between operators or heuristics and a dimension, $\Omega_w = \{\{\{\forall_{l,i,j}\} \in \{\Lambda_i\}\} \cup \{\Lambda_i\}\}$ where a world automaton specifies the set of all data elements which belong to all clusters within a sub-universe and the universe, $H = \{\forall \Omega_w\}$ where a hyperspace automaton defines the universe of a problem domain,
    where each kernel function is a parametric function that projects dimensional data onto the high dimensional hyperspace structure, each kernel function including a plurality of multiple independent kernels, where $k(x,x') = k_1(x,x') + k_2(x,x') \ldots$ defines a kernel function from a summation of the plurality of multiple independent kernels.

2. The biometric data processing system of claim 1, wherein the biometric input includes at least two types of input selected from a group consisting of: fingerprint data, facial feature data, iris data, retinal data, handwriting data, and voice data.

3. The biometric data processing system of claim 1, further comprising a matching system for determining whether feature vectors obtained from biometric input correspond to data stored in the hyperspace structure.

4. The biometric data processing system of claim 1, further comprising a storage system for storing data obtained from biometric input in the hyperspace structure.

5. The biometric data processing system of claim 1, wherein each kernel function creates a mapping of an input x to output y with a weight w.

6. The biometric data processing system of claim 1, wherein the hyperspace structure includes a plurality of sub-universes that define a set of dimensions, wherein each dimension includes an associated policy and a set of operators.

7. The biometric data processing system of claim 1, wherein at least one of the kernel functions comprises a bootstrapped C-means clustering algorithm.

8. A non-transitory computer readable medium having a computer program product stored thereon for processing biometric data, comprising:
    program code for extracting feature vectors from a biometric input; and
    program code for implementing a support vector machine (SVM) having a plurality of kernel functions, wherein each kernel function is configured for mapping a feature vector to a high dimensional hyperspace structure,
    wherein the high dimensional hyperspace structure is defined as follows:
    H=Hyperspace
    $\Lambda_i$=Sub-Universe
    $\Omega_w$=World
    $\phi_{i,j}$=Dimension
    $\rho_{i,j}$=Policy
    $\delta_{i,j,k}$=Operator
    $A_l$=Cluster
    $\alpha_{l,i,j}$=Bin Member
    where i=sub-universe number, j=dimension number, k=operator number, l=cluster number, m=world number, $A_l = \{\forall_{l,i,j}\}$ where a cluster is defined as a set of all cluster members, each cluster member being vectored into a high dimensional space, $\Lambda_i = \{\forall_{i,j}\}$ where a sub-universe is defined as a set of dimensions, $\phi_{i,j} = \exists_{i,j} \cup \{\forall_{i,j,k}\}$ where for each dimension there exists an associated policy and a set of operators, the policy providing an association between operators or heuristics and a dimension, $\Omega_w = \{\{\{\forall_{l,i,j}\} \in \{\Lambda_i\}\} \cup \{\Lambda_i\}\}$ where a world automaton specifies the set of all data elements which belong to all clusters within a sub-universe and the universe, $H = \{\forall \Omega_w\}$ where a hyperspace automaton defines the universe of a problem domain,
where each kernel function is a parametric function that projects dimensional data onto the high dimensional hyperspace structure, each kernel function including a plurality of multiple independent kernels, where $$k(x,x')=k_1(x,x')+k_2(x,x')\ldots$$

defines a kernel function from a summation of the plurality of multiple independent kernels.

9. The non-transitory computer readable medium of claim 8, wherein the biometric input includes at least two types of input selected from a group consisting of: fingerprint data, facial feature data, iris data, retinal data, handwriting data, and voice data.

10. The non-transitory computer readable medium of claim 8, further comprising program code for determining whether feature vectors obtained from biometric input correspond to data stored in the hyperspace structure.

11. The non-transitory computer readable medium of claim 8, further comprising program code for storing data obtained from biometric input in the hyperspace structure.

12. The non-transitory computer readable medium of claim 8, wherein each kernel function creates a mapping of an input x to an output y with a weight w.

13. The non-transitory computer readable medium of claim 8, wherein the hyperspace structure includes a plurality of sub-universes that define a set of dimensions, wherein each dimension includes an associated policy and a set of operators.

14. A method for processing biometric data, comprising:
extracting a set of feature vectors from a biometric input;
providing a support vector machine (SVM) having a plurality of kernel functions, wherein each kernel function is configured for mapping a feature vector to a high dimensional hyperspace structure, wherein the high dimensional hyperspace structure is defined as follows:
H=Hyperspace
$\Lambda_i$=Sub-Universe
$\Omega_w$=World
$\phi_{i,j}$=Dimension
$\rho_{i,j}$=Policy
$\delta_{i,j,k}$=Operator
$A_l$=Cluster
$\alpha_{l,i,j}$=Bin Member
where i=sub-universe number, j=dimension number, k=operator number, l=cluster number, m=world number, $$A_l=\{\forall_{l,i,j}\}$$

where a cluster is defined as a set of all cluster members, each cluster member being vectored into a high dimensional space, $$\Lambda_i=\{\forall_{i,j}\}$$

where a sub-universe is defined as a set of dimensions, $$\phi_{i,j}=\exists_{i,j}U\{\forall_{i,j,k}\}$$

where for each dimension there exists an associated policy and a set of operators, the policy providing an association between operators or heuristics and a dimension, $$\Omega_w=\{\{\{\forall_{l,i,j}\}\epsilon\{\Lambda_i\}\}U\{\Lambda_i\}$$

where a world automaton specifies the set of all data elements which belong to all clusters within a sub-universe and the universe, $$H=\{\forall\Omega_w\}$$

where a hyperspace automaton defines the universe of a problem domain, where each kernel function is a parametric function that projects dimensional data onto the high dimensional hyperspace structure, each kernel function including a plurality of multiple independent kernels, where $$k(x,x')=k_1(x,x')+k_2(x,x')\ldots$$

defines a kernel function from a summation of the plurality of multiple independent kernels; and
mapping each extracted feature vector into the high dimensional hyperspace structure.

15. The method of claim 14, wherein the biometric input includes at least two types of input selected from a group consisting of: fingerprint data, facial feature data, iris data, retinal data, handwriting data, and voice data.

16. The method of claim 14, further comprising determining whether the set of feature vectors correspond to data stored in the hyperspace structure.

17. The method of claim 14, further comprising storing data obtained from biometric input in the hyperspace structure.

18. The method of claim 14, wherein each kernel function creates a mapping of an input x to an output y with a weight w.

19. The method of claim 14, wherein the hyperspace structure includes a plurality of sub-universes that define a set of dimensions, wherein each dimension includes an associated policy and a set of operators.

20. A method for deploying a computer system for processing biometric data, comprising:
configuring the computer system to perform the method comprising:
extract a set of feature vectors from a biometric input;
provide a support vector machine (SVM) having a plurality of kernel functions, wherein each kernel function is configured for mapping a feature vector to a high dimensional hyperspace structure,
wherein the high dimensional hyperspace structure is defined as follows:
H=Hyperspace
$\Lambda_i$=Sub-Universe
$\Omega_w$=World
$\phi_{i,j}$=Dimension
$\rho_{i,j}$=Policy
$\delta_{i,j,k}$=Operator
$A_l$=Cluster
$\alpha_{l,i,j}$=Bin Member
where i=sub-universe number, j=dimension number, k=operator number, l=cluster number, m=world number, $$A_l=\{\forall_{l,i,j}\}$$

where a cluster is defined as a set of all cluster members, each cluster member being vectored into a high dimensional space, $$\Lambda_i=\{\forall_{i,j}\}$$

where a sub-universe is defined as a set of dimensions, $$\phi_{i,j}=\exists_{i,j}U\{\forall_{i,j,k}\}$$

where for each dimension there exists an associated policy and a set of operators, the policy providing an association between operators or heuristics and a dimension, $$\Omega_w=\{\{\{\forall_{l,i,j}\}\epsilon\{\Lambda_i\}\}U\{\Lambda_i\}$$

where a world automaton specifies the set of all data elements which belong to all clusters within a sub-universe and the universe, $$H=\{\forall \Omega_w\}$$

where a hyperspace automaton defines the universe of a problem domain, where each kernel function is a parametric function that projects dimensional data onto the high dimensional hyperspace structure, each kernel function including a plurality of multiple independent kernels, where $$k(x,x')=k_1(x,x')+k_2(x,x')\ldots$$

defines a kernel function from a summation of the plurality of multiple independent kernels; and mapping each extracted feature vector into the high dimensional hyperspace structure.

* * * * *